April 30, 1968  E. K. PERSSON  3,381,199
COMPENSATED DIRECT CURRENT MOTOR CONTROL APPARATUS
Filed Aug. 14, 1964
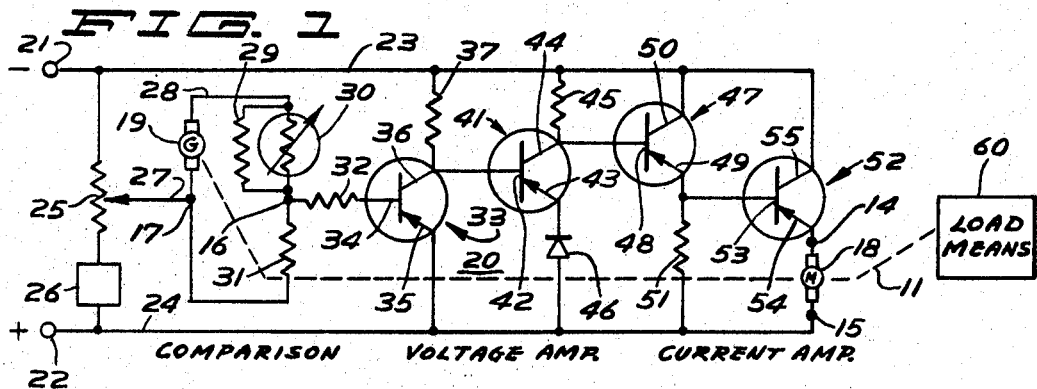
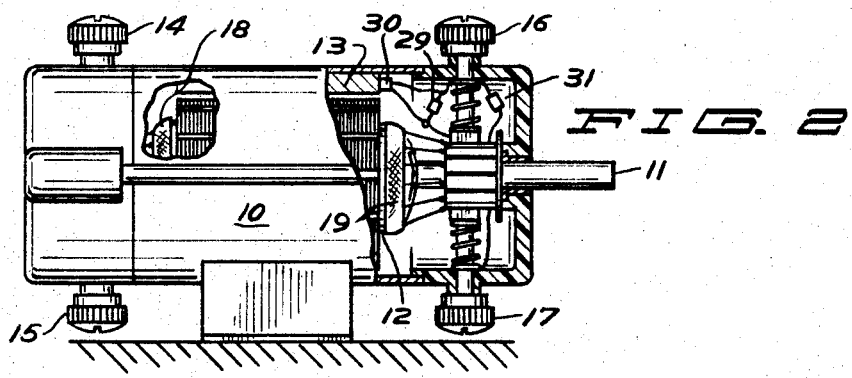
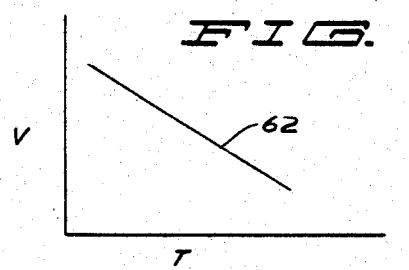
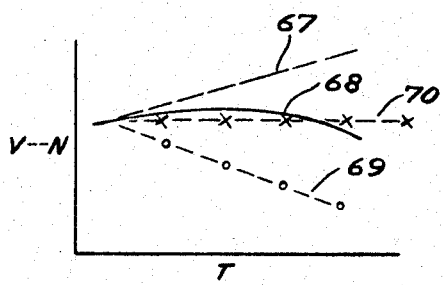
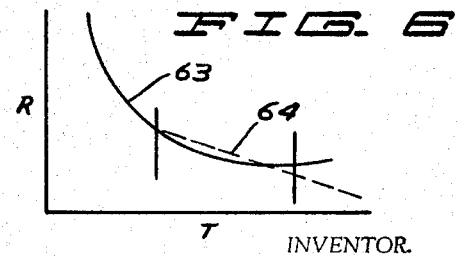
INVENTOR.
ERLAND K. PERSSON
BY
ATTORNEYS U̲n̲i̲t̲e̲d̲ ̲S̲t̲a̲t̲e̲s̲ ̲P̲a̲t̲e̲n̲t̲ ̲O̲f̲f̲i̲c̲e̲  3,381,199
Patented Apr. 30, 1968

3,381,199
COMPENSATED DIRECT CURRENT MOTOR CONTROL APPARATUS
Erland K. Persson, Minneapolis, Minn., assignor to Electro-Craft Corporation, Hopkins, Minn., a corporation of Minnesota
Filed Aug. 14, 1964, Ser. No. 389,714
4 Claims. (Cl. 318—327)

This invention relates generally to control apparatus and is more particularly directed to control apparatus for accurately controlling the rotational velocity of electric motor-generator apparatus wherein a source of magnetic energy for the motor-generator is comprised of material exhibiting temperature responsive flux density characteristics.

This invention further relates to and is an improvement on the control apparatus shown and described in my earlier filed copending application for U.S. Letters Patent, Ser. No. 372,530, filed June 4, 1964, for Control Apparatus.

In typical apparatus with which my invention is concerned, a combined motor-generator is constructed with a permanently magnetized source of magnetic energy of predetermined flux density for providing a suitable magnetic flux for electrically independent and physically interdependent motor and generator windings on the same rotating structure. In such a typical embodiment of this apparatus, the source of magnetic energy may conveniently be comprised of barium ferrite material which is easily permanently magnetized to provide a satisfactory source of magnetic flux for operation of the motor and generator.

As set forth in my earlier filed copending application, the output of the generator winding is compared to a reference potential and a predetermined relationship between the reference potential and the output of the generator winding is established to maintain the correct rotational velocity of the motor shaft through energization of the motor winding with an electric current. It has been discovered that certain sources of magnetic energy, including barium ferrite, are responsive to changes in temperature whereby the flux density of, for example, barium ferrite decreases in a generally linear relationship with increase in temperature. The increase in temperature of the source of magnetic energy may be influenced by internal heating of the motor-generator structure in operation or from external environmental influences. In any case, the flux density will decrease with an increase in temperature and the corresponding output of the generator winding will decrease. Under such conditions of operation, the relationship between the output of the generator winding and the source of reference potential is such that the speed of the motor is increased to maintain the predetermined relationship. Since the primary purpose of the control apparatus is to maintain a predetermined rotational velocity of the shaft upon which the motor and generator windings are mounted, the change of speed in response to changes of ambient and internal temperature is undesirable.

As will become apparent from the consideration of the more detailed description set forth below, I have provided a novel and improved control apparatus which substantially eliminates the effects of temperature change on the overall characteristics of the control apparatus. Briefly, this is accomplished by utilizing a temperature responsive impedance device which is connected to the output of the generator winding to influence the same in accordance with ambient and internal temperature changes whereby the effective output voltage or potential of the generator winding as compared with the source of reference potential remains substantially constant and an increased regulation and stability of operation of the control apparatus is obtained to provide a substantially constant rotational velocity of an output shaft.

It is therefore an object of my invention to provide improved control apparatus for use in combination with a motor-generator to accurately control the rotational velocity of an output shaft.

A further object of my invention is to provide control apparatus of the class above described which provides improved stability of operation over wide variations in ambient and internal temperatures of operation.

Another object of my invention is to provide control apparatus having improved operational characteristics for regulating the rotational velocity of an output shaft.

A still further object of my invention is to provide improved control apparatus for use in combination with apparatus described above in which a temperature responsive impedance device is connected in series with the output of a generator winding.

Another object of my invention is to provide improved stability and regulating of the rotational velocity of an output shaft.

Another object of my invention is to provide control apparatus for controlling the rotational velocity of a motor-generator within predetermined limits and to maintain a predetermined rotational velocity over wide variation in ambient and internal temperature of the motor-generator and to provide increased speed of response to any such environmental temperature changes.

These and other objects of my invention will become apparent from a consideration of the appended specification, claims and drawing, in which FIG. 1 is an electrical schematic diagram of control apparatus embodying the principles of my invention.

FIG. 2 is a side elevational view of a typical motor-generator which may be used in conjunction with the control apparatus and which is partly broken away to illustrate several features of my invention.

FIGS. 3, 4, 5 and 6 are graphs representing the characteristics of several of the elements shown in FIGS. 1 and 2 with variation in temperature.

Referring to FIG. 1 of the drawing, there is shown a motor-generator 10 suitably connected to a control apparatus indicated generally by reference character 20. An output shaft 11 on motor-generator 10 is shown connected to a suitable load means 60 to be driven at a predetermined constant rotational velocity.

Motor-generator 10 is shown having a rotatable shaft 11 journaled in suitable bearings therefor and including a rotatable armature portion 12 upon which are wound suitable motor windings 18 and generator windings 19. Armature 12 is rotatable within a substantially concentric and annular source of magnetic energy indicated generally by reference character 13. The source of magnetic energy may be comprised of, for example, permanently magnetized barium ferrite, or the like material. Suitable commutators are provided on either end of armature 12 and may be in electrical communication with a pair of motor terminals 14 and 15 and a pair of generator terminals 16 and 17. Further details of motor-generator 10 may be found in my copending application, Ser. No. 372,530, filed June 4, 1964, for Control Apparatus.

Also shown in FIG. 2 are a plurality of internally disposed impedance elements 29, 30 and 31. The electrical connection for these devices is more clearly shown in FIG. 1. However, it may be seen that impedance elements 29 and 30 are connected in parallel intermediate generator terminal 16 and a conductive brush that is in electrical communication with the commutator connected to generator winding 19. Impedance element 31 is connected intermediate terminal 16 and terminal 17. While not shown on the drawing, it may be apparent to those skilled in the art that there is an electrical discontinuity intermediate generator terminal 16 and its associated brush so as to allow for the series connection of impedance elements 29 and 30 as shown in FIG. 1 of the drawing. Impedance element 30 is indicated as a variable impedance element and may be of the general class of devices referred to by those skilled in the art as thermistors, which possess the characteristic of changing impedance, or resistance, in accordance with temperature changes. Variable impedance element 30 may be attached to the source of magnetic energy 13 by suitable fastening means, for example, epoxy adhesives.

In FIG. 1 of the drawing, there is shown a pair of terminals 21 and 22 adapted for connection to a suitable source of electrical energy (not shown). Terminal 21 is connected to a conductor 23 and terminal 22 is connected to a conductor 24. A potentiometer winding 25 and a condition responsive impedance means 26 are shown connected in series intermediate conductors 23 and 24. A transistor 33 having base emitter and collector electrodes 34, 35 and 36 is shown having its collector electrode connected to conductor 23 through resistor 37, its emitter electrode directly connected to conductor 24 and its base electrode connected to an adjustable wiper 27 operatively associated with potentiometer winding 25, through resistor 32 and a parallel circuit comprised of impedance element 31 and generator winding 19 and variable impedance element 30, having impedance element 29 connected in parallel therewith, also connected intermediate terminals 16 and 17.

A further transistor 41 having base emitter and collector electrodes 42, 43 and 44 is shown having its base electrode connected to collector electrode 36 on transistor 33, its collector electrode connected to conductor 23 through resistor 45 and its emitter electrode connected to conductor 24 through asymmetrical current conducting device 45. Transistor 47 having base emitter and collector electrodes 48, 49 and 50 is shown having its base electrode connected to collector 44 on transistor 41, its collector electrode connected to conductor 23 and its emitter electrode connected to conductor 24 through resistor 51. A further transistor 52 having base emitter and collector electrodes 53, 54 and 55 is shown having its base electrode connected to emitter electrode 49 on transistor 47, its collector electrode connected to conductor 23 and its emitter electrode connected to conductor 24 through motor terminal 14, motor winding 18 and motor terminal 15. An output shaft 11 is shown in dotted form as extending intermediate generator winding 19, motor winding 18 and load means 60.

OPERATION

In operation, terminals 21 and 22 are energized from a suitable source of direct current energy and potentiometer wiper 27 is positioned in accordance with a desired rotational velocity of output shaft 11. The conduction of transistors 33, 41, 47 and 52 is determined by the potential at potentiometer wiper 27 and the potential developed across generator terminals 16 and 17. At the desired rotational velocity, the conduction of transistor 52 is sufficient to maintain energization of motor winding 18 at the level necessary to maintain output shaft 11 at the predetermined desired rotational velocity. Variations in torque, or load, imposed by load means 60 will affect the rotational velocity of output shaft 11 which in turn affects the potential appearing at generator terminals 16 and 17 connected to generator winding 19 to cause an increase or decrease in conduction of transistor 52 whereby the rotational speed of shaft 11 is maintained at a constant predetermined value. Further description of operation of the control apparatus, including the operation of condition responsive transducer device 26, may be found in the above referred to copending application.

In the above described embodiment, the material barium ferrite may be seen to possess a negative change in flux density of 0.2% per degree centigrade. It has therefore been noted that as the ambient environmental temperature increases, or heating of the motor-generator structure due to current flow therethrough occurs, the flux density of the source of magnetic energy 13 decreases in a substantially linear fashion whereby the output voltage for a constant rotational velocity across the terminals of generator winding 19 diminishes with temperature as indicated by curve 62 in FIG. 3. The decrease of output voltage due to the decrease in flux density from magnetic energy source 13 results in an increase in speed of the motor and output shaft 11 which, of course, is undesirable in view of the primary objectives of the control apparatus to maintain a constant rotational velocity of shaft 11. In accordance with the principles of my invention, the addition of a temperature responsive impedance device 30 may be utilized to provide a complementary linear increase in output voltage at generator terminals 16 and 17 as indicated by curve 65 in FIG. 4 of the drawings, whereby the potential supplied from generator winding 19 to the comparison portion of the control apparatus remains substantially constant with variations in ambient and internal temperature of the motor-generator.

In FIG. 6 there is shown a typical resistance-temperature curve 63 of a thermistor as might be employed for variable impedance device 30. By suitably connecting a further impedance element 29 in parallel therewith a portion of the curve 63 may be selected, as shown by dotted line 64, to provide the desirable, substantially linear variation in impedance with changes in temperature.

In FIG. 5 there is shown a family of curves in which curve 67 illustrates the increase in speed with temperature without the inclusion of impedance elements 30 and 29 in the circuit of FIG. 1; curve 68 illustrates the velocity, or speed, of output shaft 11 of the apparatus in which the principles of my invention have been incorporated; curve 69 is representative of the potential appearing across generator terminals 16 and 17 without the above referred to impedance elements; and curve 70 illustrates the potential across generator terminals 16 and 17 for control apparatus as illustrated in FIG. 1.

Under operational conditions, a Model E–500 "Motomatic" system, manufactured by the Electro-Craft Corporation of Minneapolis, Minn., was observed to be operative at an 8 inch-ounce continuous load. Before the principles of my invention were applied to the control apparatus, a speed change of 8.5% between the temperatures of 25° C. and 65° C. was observed. The addition of elements as shown in the above described embodiment of my invention resulted in a speed change of less than 1% under identical load and temperature variation conditions. The values of the impedance elements utilized were as follows: variable impedance element 30—a thermistor having a resistance of 1300 ohms at 25° C. and a beta of 3530; impedance element 29—1000 ohm resistor and impedance element 31—3300 ohm resistor.

It will now be apparent to those skilled in the art that the nature and value of the elements utilized to substantially eliminate the undesirable variation of rotational velocity with temperature may be selected for use with any presently available control apparatus and devices with which my invention is concerned.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. Control apparatus comprising in combination; motor-generator means having input and output terminals and including an output shaft and a source of magnetic energy exhibiting temperature responsive magnetic flux density characteristics; temperature responsive variable impedance means disposed in heat transferring relationship with said source of magnetic energy and connected in signal modifying relationship with the output terminals of said motor-generator means; amplifying means, including a source of electric current, having input and output terminals; circuit means connecting the output terminals of said amplifying means to the input terminals of said motor-generator means; and further circuit means, including means for comparing said signal potential with a source of reference potential, connecting the input terminals on said amplifying means to the output terminals on said motor-generator means.

2. The apparatus of claim 1 in which a further impedance means is connected in parallel with the temperature responsive variable impedance means.

3. The apparatus of claim 1 in which the temperature responsive impedance means is connected in series relationship with one of the output terminals on the motor-generator means.

4. The apparatus of claim 1 in which the circuit means includes impedance means connected in parallel with the output terminals of the motor-generator means.

References Cited

UNITED STATES PATENTS

| | | | |
|---|---|---|---|
| 2,713,660 | 7/1955 | Davis | 318—327 X |
| 3,227,937 | 1/1966 | Koppelmann et al. | 318—327 X |
| 3,257,596 | 6/1966 | Wilkins | 318—327 |

ORIS L. RADER, *Primary Examiner.*

J. C. BERENZWEIG, J. J. BAKER, *Assistant Examiners.*